United States Patent Office 3,441,632
Patented Apr. 29, 1969

3,441,632
PROCESS FOR PRODUCING UNSATURATED
POLYESTER RESINS OF IMPROVED AIR DRY
Hisao Tanaka and Isamu Nishikawa, Hitachi-shi, Japan, assignors to Hitachi Chemical Company, Ltd., Tokyo, Japan, a corporation of Japan
No Drawing. Filed June 21, 1966, Ser. No. 559,092
Claims priority, application Japan, June 25, 1965, 40/37,571
Int. Cl. C08f 21/00; C08g 17/18
U.S. Cl. 260—863                                    11 Claims

ABSTRACT OF THE DISCLOSURE

A process for producing an unsaturated polyester resin having improved air-drying properties which comprises reacting an unsaturated polyester with allyl alcohol and formaldehyde (or paraformaldehyde) to obtain as the reaction product a formalized unsaturated polyester, and admixing the resultant reaction product with a polymerizable ethylenically unsaturated monomer.

---

The present invention relates to a process for producing unsaturated polyester resins. More specifically, the invention relates to a process for producing unsaturated polyester resins modified with paraformadlehyde and allyl alcohol.

Principal object of the invention is to provide a method for producing unsaturated polyester resins, having an improved air-drying property.

Since unsaturated polyester resins are hardened with the progress of radical polymerization of the resins, it is generally recognized that the hardening of the resins is somewhat retarded in the area being contacted with air.

It has been well known that unsaturated polyester resins may be cured while avoiding the contact of the resins with the surrounding air by using a mixture of the resins and paraffin material.

This method, however, possesses various disadvantages such that a high quality paraffin being easily dispersible in the resins and having sufficient crystallinity to give the desired air-drying property to the product is hard to obtain and that, when the mixture is molded, it is inevitable to result in an inferior product having various defects derived from the employed paraffin, e.g., pinholes and airholes.

Apart from the above, such method as comprising polymerizing an unsaturated polyester and an unsaturated acetal having at least one olefinic double bond in its molecule has been proposed as disclosed in Japanese Patent No. 293,884, issued on Feb. 12, 1962. However, the unsaturated polyester resins prepared by this method possess the unfavorable property of forming a gel while storing them for a long duration of time.

In the specification of U.K. Patent No. 869,298, there is described a method comprising reacting one $\alpha,\beta$-unsaturated dicarboxylic acid and one monohydric ether alcohol having at least two ethylenic double bonds in the $\beta,\gamma$-position to the ether oxygen, but the method can hardly be adapted for use in preparing a high molecular unsaturated polyester since the molecular weight is regulated by the employment of monohydric alcohol.

Accordingly, the method is undesirable for the reasons that the product does not possess a characteristic toughness and hardness usually found in a high molecular polymer and, hence, it is easy to develop cracks therein.

The present invention which was accomplished with the object of overcoming the aforesaid defects now furnishes a manufacturing method for unsaturated polyester resins comprising reacting the unsaturated polyester obtained by the reaction of an $\alpha,\beta$-unsaturated dibasic acid and a polyhydric alcohol with allyl alcohol and formaldehyde, and adding the thus obtained reaction product to a polymerizable ethylenically unsaturated monomer.

The following acids are illustrative of those useful as $\alpha,\beta$-unsaturated dibasic acids in the present invention: maleic acid, maleic anhydride, fumaric acid, itaconic acid and citraconic acid.

The polyhydric alcohols employed in the method of this invention may include ethylene glycol, diethylene glycol, propylene glycol, dipropylene glycol, neopentyl glycol, glycerol, trimethylol ethane, trimethylol propane, pentaerythritol and the like.

As for the polymerizable ethylenically unsaturated monomers advantageously employed in this invention, the following monomers may be included: styrene, methacrylic acid, methyl methacrylate, methyl acrylate, acrylonitrile, vinyl acetate, glycidyl methacrylate, diallyl phthalate, triallyl cyanurate, etc.

In the practice of this invention, the first reaction product, i.e., unsaturated polyester, may advantageously be obtained by heating the mixture of $\alpha,\beta$-unsaturated dibasic acid and polyhydric alcohol at a temperature of 100°–220° C. under an inert gas stream. The polyhydric alcohol component is used in 10–150% (equivalent) excess of the stoichiometric equivalent of the $\alpha,\beta$-unsaturated dibasic acid.

As for the inert gas, nitrogen, carbon dioxide and the like may successfully be employed. The thus prepared unsaturated polyester may desirably possess a hydroxyl value of 10–450 and an acid value of less than 45.

In order to prevent the formation of gel in the reaction product of said unsaturated polyester, an appropriate amount of polymerization inhibitor such as, for example, hydroquinone, p-tert.-butyl catechol and pyrogallol may advantageously be added to the reaction mixture. In this reaction, the resulting water may be taken out from the reaction system by using a solvent which forms an azeotropic mixture with water, e.g., toluene and xylene.

After obtaining the unsaturated polyester having a desired acid value, the reaction mixture is cooled to below 60° C. and reacted with allyl alcohol and formaldehyde, the additive amounts of these reagents being 30–130% (equivalent) based on the amounts of hydroxyl groups in the polyester, respectively.

Preferably, the formaldehyde may be used in an amount of 30–100% (equivalent) with respect to the hydroxyl value of the polyester, and the allyl alcohol in an amount of 100–130% (equivalent) based on the amount of the formaldehyde.

When paraformaldehyde is employed as the formaldehyde component, none of the troubles of carrying water in the reaction system is encountered therewith.

The catalyst effectively employed in carrying out the formal reaction according to the invention is, for example, sulfuric acid, ferric chloride, or calcium chloride. The preferred catalyst is ferric chloride, which is usually employed in an amount of from 0.1 to 5.0% (by weight) based on the amount of reaction mixture.

The formal reaction may be carried out by heating the mixture in an inert gas atmosphere at 110°–140° C. for 1–6 hours.

The resultant formalized unsaturated polyester is then mixed with a polymerizable ethylenically unsaturated monomer to give the final product of unsaturated polyester resin.

The unsaturated polyester resin obtained by the method of this invention may be mixed with an appropriate amount of polymerization initiator such as, for example, benzoyl peroxide, methyl ethyl ketone peroxide, cumene hydroperoxide, di-tert.-butyl peroxide, and azobisisobutyronitrile, and, if desired, a polymerization regulator such as, for example, dimethyl aniline, cobalt naphthenate, triethylamine, and dodecyl mercaptan, and the mixture may be cured under conventional curing conditions to give a molded article.

The unsaturated polyester resins of the present invention may also be added with other materials such as, for example, filler (e.g. calcium carbonate, clay, and talc), fibrous base material, and coloring material.

It must be appreciated that the unsaturated polyester resins of the present invention are never affected unfavorably by the surrounding air in the curing step of the resins and possess a good air-drying property.

The characteristics of the present process will be more fully understood by referring to the following examples. The term "part" as appears in these examples, unless otherwise stated, means "part by weight."

EXAMPLE 1

294 parts of maleic anhydride, 212 parts of diethylene glycol and 184 parts of glycerine were placed in a four-necked flash having a capacity of 2 liters and being provided with a thermometer, a fractionating column, an inlet for a nitrogen gas stream and a stirrer, and the mixture was heated at 160° C. for 3 hours and at 210° C. for 8 hours with stirring.

Thereafter, the mixture was cooled to 85° C. and held at a reduced pressure of 20 mm. Hg for 2 hours to obtain an unsaturated polyester of hydroxyl value=364 and acid value=20.

100 parts of the thus obtained unsaturated polyester were placed into another four-necked flask provided with a thermometer, a reflux condenser, a nitrogen gas blowing tube, and a stirrer, and 41.4 parts (110% equivalent for hydroxyl value) of allyl alcohol, 20.5 parts (100% equivalent for hydroxyl value) of paraformaldehyde (95% purity), 0.02 of hydroquinone, and 4 parts of ferric chloride were added thereto. The mixture was heated at 130°–135° C. for 310 minutes with stirring in a nitrogen gas atmosphere to formalize said unsaturated polyester.

After cooling to 90° C., the product was added with 120 parts of styrene to prepare the unsaturated polyester resin of the invention.

To 100 parts of the resin, 1.4 parts of methyl ethyl ketone peroxide, and 0.5 part of cobalt naphthenate xylene solution (Co metal content 6%) were added and the mixture was coated on a glass plate in 0.15 mm. thickness. The coated layer was cured at 45° C. for 30 minutes and at 75° C. for 15 minutes and thereby a smooth and glossy coating was obtained. The Clemense hardness of the resultant resin was 180 grams.

When either the allyl alcohol or formaldehyde was not added or when both the alcohol and the formaldehyde were added but without cooking, a film which was obtained by curing under the same conditions was tacky.

EXAMPLE 2

196 parts of maleic anhydride, 130 parts of itaconic acid, 319 parts of propylene glycol and 0.02 part of hydroquinone were reacted as in Example 1 and an unsaturated polyester having a hydroxyl value of 165 and an acid value of 16 was obtained.

To 100 parts of the polyester, 24 parts of allyl alcohol, 11 parts of paraformaldehyde (95% purity), and 2.8 parts of ferric chloride were added and the mixture was refluxed at 130°–135° C. for 4.5 hours to formalize said unsaturated polyestre.

100 parts of the formalized unsaturated polyester were added with 35 parts of styrene and 15 parts of methyl methacrylate and then the resultant resin was cured in the presence of a catalyst mixture of cumene hydroperoxide (2% by weight) and benzoyl peroxide (0.5% by weight) at 80° C. for 2 hours and 105° C. for 2 hours.

The obtained product possessed a non-tacky surface, a surface hardness (Rockwell M) of 118 and a bending strength of 780 kg./cm.$^2$.

EXAMPLE 3

To 100 parts of the unsaturated polyester (acid value 28, hydroxyl value 80) obtained by the reaction of 232 parts of fumaric acid, 167 parts of propylene glycol and 0.004 part of hydroquinone, allyl alcohol and para formaldehyde (95% purity) were added, their respective amounts being inidcated below in Table I, and the mixture was heated in the presence of 0.1 part of ferric chloride at 135° C. for 4 hours under a carbon dioxide gas stream.

100 parts of the thus obtained unsaturated polyester were added with 35 parts of styrene, 1 part of cobalt naphthenate xylene solution (6% cobalt content), 0.67 part of cumene hydroperoxide, and 0.67 part of benzoyl peroxide, and the mixture was coated on a stainless plate, which was then passed through drying ovens having a temperature distribution of 40°, 60° and 80° C. in 120 minutes by means of belt conveyors.

In every case, a glossy, hard coating was obtained. The hardness of the thus obtained resin coatings and the amounts employed of allyl alcohol and paraformaldehyde are shown below.

TABLE 1

| Ally alcohol, parts | Paraformaldehyde, parts | Clemense hardness (g) |
|---|---|---|
| 10.9 | 5.70 | 160 |
| 8.4 | 5.70 | 151 |
| 10.9 | 4.30 | 196 |
| 8.4 | 4.30 | 201 |

The invention being thus described, it will be obvious that the same may be varied in many ways. Such variations are not to be regarded as a departure from the spirit and scope of the invention, and all such modifications are intended to be included within the scope of the following claims.

What we claim is:

1. A process for producing an unsaturated polyester resin which comprises simultaneously reacting an unsaturated polyester, obtained by the reaction of an $\alpha,\beta$-unsaturated dibasic acid and a polyhydric alcohol, with allyl alcohol and formaldehyde in the presence of a catalyst selected from the group consisting of sulfuric acid, ferric chloride and calcium chloride to obtain as the reaction product a formalized unsaturated polyester, and admixing the resultant reaction product with polymerizable ethylenically unsaturated monomer.

2. A process according to claim 1, wherein said unsaturated polyester is obtained by reacting 1 mole of $\alpha,\beta$-unsaturated dibasic acid and 1.1–2.5 moles of polyhydric alcohol under an inert gas stream at 100°–220° C.

3. A process according to claim 1, wherein an unsaturated polyester having a hydroxyl value of 10 to 450 and an acid value of up to 45 is heated together with paraformaldehyde and allyl alcohol.

4. A process according to claim 3, wherein the amount of paraformaldehyde is 30 to 130% (equivalent) based on the hydroxyl value of the unsaturated polyester.

5. A process according to claim 3, wherein the amount of allyl alcohol is 30 to 130% (equivalent) based on the hydroxyl value of the unsaturated polyester.

6. A process according to claim 1, wherein an unsaturated polyester is heated together with paraformaldehyde and allyl alcohol at a temperature of 110° to 140° C.

7. A process according to claim 3, wherein the amount of the catalyst is 0.1 to 5.0% by weight based on the weight of the reaction mixture.

8. A process according to claim 3, wherein the heating is effected at a temperature of 110° to 140° C.

9. A process for producing an unsaturated polyester resin which comprises simultaneously reacting an unsaturated polyester, obtained by the reaction of an $\alpha,\beta$-unsaturated dibasic acid and a polyhydric alcohol and having a hydroxyl value of 10 to 450 and an acid value of up to 45, with allyl alcohol and a formaldehyde, the amount of allyl alcohol and formaldehyde employed each being 30 to 130% (equivalent) based on the hydroxyl value of the unsaturated polyester, in the presence of a catalyst selected from the group consisting of sulfuric acid, ferric chloride and calcium chloride at a temperature of about 110° to 140° C. to obtain as the reaction product a formalized unsaturated polyester and admixing the resultant reaction product with a polymerizable ethylenically unsaturated monomer.

10. A process according to claim 9, wherein said formaldehyde is paraformaldehyde.

11. A process according to claim 10, wherein said catalyst is employed in an amount of 0.1 to 5.0% by weight, based on the weight of the reaction mixture.

References Cited

UNITED STATES PATENTS

| 2,889,312 | 6/1959 | Szayna | 260—861 |
| 3,123,578 | 3/1964 | Kraft | 260—67 |
| 3,176,050 | 3/1965 | Jen et al. | 260—861 |
| 3,210,441 | 10/1965 | Dowling et al. | 260—867 |

MURRAY TILLMAN, *Primary Examiner.*

J. T. GOOLKASIAN, *Assistant Examiner.*

U.S. Cl. X.R.

260—67, 75, 861, 865